US008010083B2

(12) United States Patent
Descombes et al.

(10) Patent No.: US 8,010,083 B2
(45) Date of Patent: Aug. 30, 2011

(54) DETECTION OF CLONED IDENTIFIERS IN COMMUNICATION SYSTEMS

(75) Inventors: Pierre-Yves Descombes, Annecy-le-vieux (FR); Eddie Iwulski, Alby sur Cheran (FR); Hamid Wassifi, Juan les Pins (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 824 days.

(21) Appl. No.: 11/802,157

(22) Filed: May 21, 2007

(65) Prior Publication Data

US 2007/0275718 A1    Nov. 29, 2007

(30) Foreign Application Priority Data

May 22, 2006  (EP) ..................................... 06300508

(51) Int. Cl.
*H04W 1/66* (2006.01)
(52) U.S. Cl. ..................... 455/410; 455/435.1; 455/406; 455/432.1; 455/432.3
(58) Field of Classification Search ................ 455/435.1
See application file for complete search history.

(56) References Cited

U.S. PATENT DOCUMENTS

| 6,091,946 A * | 7/2000 | Ahvenainen ................... 455/411 |
| 6,119,000 A * | 9/2000 | Stephenson et al. ........ 455/432.1 |
| 7,446,655 B2 * | 11/2008 | Jha et al. ................... 340/539.13 |
| 2001/0053684 A1 * | 12/2001 | Pirila ............................. 455/410 |
| 2002/0120873 A1 * | 8/2002 | Salmivalli ..................... 713/201 |
| 2004/0005875 A1 * | 1/2004 | Ko et al. ........................ 455/410 |
| 2005/0075992 A1 | 4/2005 | Gavan et al. |
| 2005/0280557 A1 * | 12/2005 | Jha et al. ......................... 340/988 |
| 2007/0032232 A1 * | 2/2007 | Bleckert et al. ............... 455/433 |

FOREIGN PATENT DOCUMENTS

| WO | 98/12891 | 3/1998 |
| WO | 99/18738 | 4/1999 |

* cited by examiner

*Primary Examiner* — Kamran Afshar
*Assistant Examiner* — Khalid Shaheed

(57) ABSTRACT

According to one aspect of the present invention, there is provided a method, in a communication system having a plurality of communication devices each having a first and second identifier associated therewith at the time of a connection attempt to the network, of identifying when one of the identifiers has been cloned, the connection status of the first identifier being obtainable from a network element, comprising receiving the first and second identifiers of a communication device, determining whether one of the identifiers has been cloned, the determination being made in part through information obtained from a connection history database, and in part through information obtained from the network element.

14 Claims, 3 Drawing Sheets

DETECTION OF CLONED IDENTIFIERS IN COMMUNICATION SYSTEMS

This application claims priority from European Patent Application 06300508.6, filed on May 22, 2006. The entire contents of the aforementioned application is incorporated herein by reference.

FIELD OF THE INVENTION

The present invention relates generally to the field of communication systems.

BACKGROUND OF INVENTION

Since the introduction of communication systems such as mobile communication systems and mobile telephony networks, and the communication devices designed to work on such systems, including mobile stations such as mobile telephones, criminals and fraudsters have sought to commit crime against both network operators and consumers.

The theft of mobile telephones, for instance, is relatively commonplace due at least partly to the fact that mobile telephones are generally relatively easy to steal since they are relatively hard to secure.

To aid in combating mobile telephone theft many mobile phone standards, such as the widely used GSM standard, require that each mobile station or mobile telephone incorporates a unique hardware identifier, referred to in GSM as the international mobile equipment identity or IMEI. Mobile telephone networks may implement an equipment identity register (EIR) which classifies IMEI numbers using a white list, for valid IMEIs, a black list, for barred IMEIs, and a grey list, for IMEIs to be tracked. The EIR is interrogated, for example when a mobile telephone attempts to connect to a mobile telephone network, and access to the network may be prevented if the IMEI is found in a black list in the EIR.

The rationale of using an EIR was that mobile telephone theft could be significantly reduced by rendering stolen mobile telephones effectively useless. However, use of the EIR has been less effective at reducing mobile telephone theft than initially hoped due to increased criminal cloning of IMEI numbers. By cloning is meant the modification of the IMEI of one mobile communication device with the IMEI of another mobile communication device. Typically, cloning is performed to enable a stolen communication device, whose IMEI is blacked listed by an EIR, to assume the identity of a non-blacklisted communication device. Cloning in this manner is generally illegal in many countries.

Another common crime is the cloning of subscriber identifiers, known in GSM as international mobile subscriber identity (IMSI). In GSM systems the IMSI is stored on a subscriber identity module (SIM) smart card and uniquely identifies a subscriber or subscription in a GSM network. By cloning an IMSI a criminal can make calls which are charged to the subscriber whose IMSI has been cloned. IMSI cloning is problematic for both the owner of the genuine IMSI, who has to convince the network operator which charges were made fraudulently, and to the network operator who will ultimately foot the bill for any fraudulent use made.

Typically, use of a cloned IMSI is only detectable when the owner of the genuine IMSI notices that he has been charged for calls not made by him, by which time the fraud will have generally already been committed. The network operator is generally obliged to provide the genuine subscriber with a new SIM card containing a new IMSI, however this inflicts further inconvenience on the genuine subscriber.

Accordingly, one aim of the present invention is to overcome, or at least alleviate, at least some of the above-mentioned problems.

SUMMARY OF THE INVENTION

According to a first aspect of the present invention, there is provided a method, in a communication system having a plurality of communication devices each having a first and second identifier associated therewith at the time of a connection attempt to the network, of identifying whether one of the identifiers has been cloned, the connection status of the first identifier being obtainable from a network element. The method comprises receiving the first and second identifiers associated with a communication device, and determining whether one of the identifiers has been cloned, the determination being made in part through information obtained from a connection history database, and in part through information obtained from the network element.

Advantageously, since detection of a communication device having an identifier determined as having been cloned may be achieved prior to the communication device being connected to the communication system helps reduce fraudulent use made of the communication system.

According to a second aspect of the present invention, there is provided apparatus, for use in a communication system having a plurality of communication devices each having a first and second identifier associated therewith at the time of a connection attempt to the network, for identifying whether one of the identifiers has been cloned. The apparatus comprises a receiver for receiving the first and second identifiers associated with a communication device, a first interface for accessing a network element for providing the connection status of the first identifier, a second interface for accessing a connection history database, the connection history database being arranged for storing, in response to a connection attempt by a communication device, connection data related to the first and second identifiers associated with that communication device, and a processor for determining whether one of the received identifiers has been cloned, the determination being made in part through data obtained from the connection history database, and in part through data obtained from the network element.

BRIEF DESCRIPTION OF THE DRAWINGS

Embodiments of the present invention will now be described, by way of non-limiting example only, with reference to the accompanying drawings, in which.

DETAILED DESCRIPTION OF EMBODIMENTS OF THE INVENTION

Figure 1:
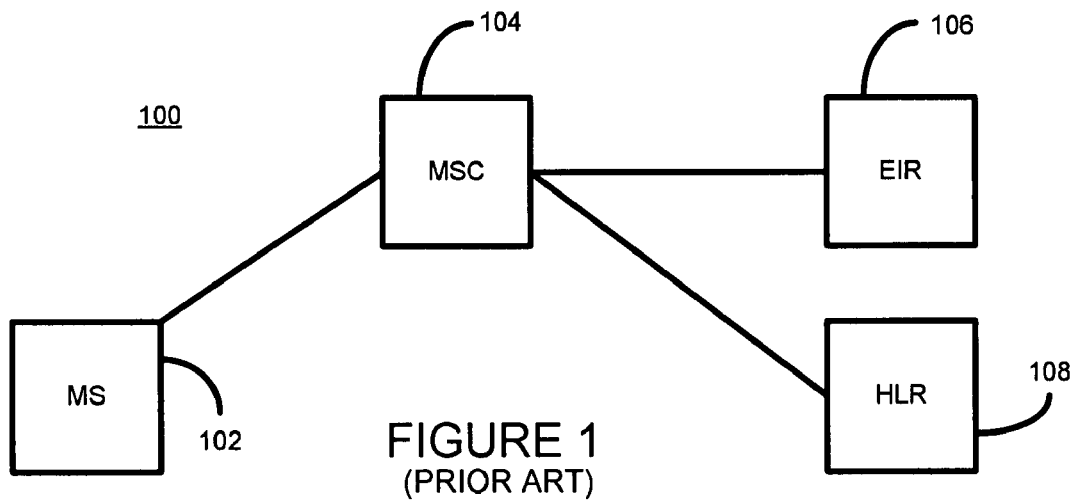
FIG. 1 is a block diagram showing a simplified view of a mobile telephony system according to the prior art.

Referring now to FIG. 1 there is shown simplified view of a mobile telephone system 100 according to the prior art. For ease of explanation not all elements of a typical mobile telephone system are shown, as will be appreciated by those skilled in the art.

When a mobile station 102, such as a mobile telephone, is switched on, signalling messages are exchanged with a mobile switching centre (MSC), such as the MSC 104 to allow the mobile station 102 to connect to the mobile telephone network. The MSC 104 obtains, in a generally known manner, both the IMEI and the IMSI from the mobile station 102. The obtained IMEI and IMSI are those identifiers which are associated with the mobile station 102 at the time the mobile station 102 attempts to connect to the communication system.

The MSC 104 sends a 'CheckIMEI' mobile application part (MAP) protocol message to an electronic identity register (EIR) 106 to determine whether the obtained IMEI is included in a black list maintained by the EIR. If the IMEI is blacklisted the MSC 104 refuses to connect the mobile station 102 to the mobile telephone network. Otherwise, the IMSI associated with the mobile station 102 is registered with a home location register (HLR) 108, and the mobile station 102 is connected to the mobile telephone network in the normal manner. Those skilled in the art will appreciate that not all steps or network elements have been described to avoid unnecessarily obscuring the description.

Figure 2:
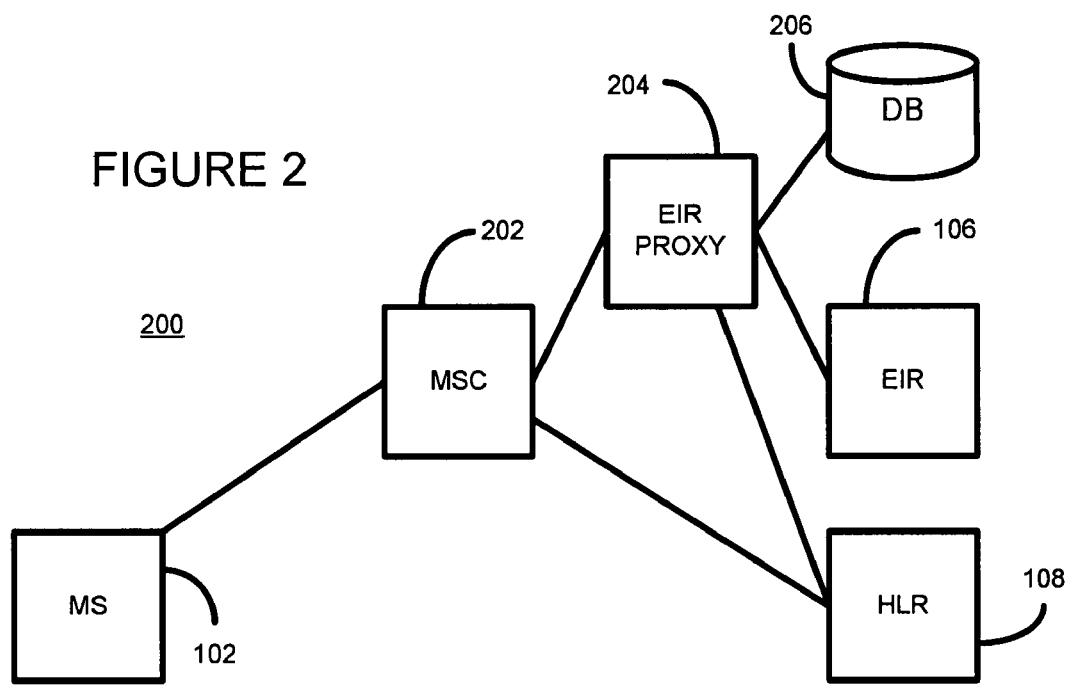
FIG. 2 is a block diagram showing a simplified view of a mobile telephony system according to an embodiment of the present invention.

Referring now to FIG. 2 there is shown a simplified block diagram of a mobile communication system 200 according to an embodiment of the present invention. The mobile communication system 200 includes some elements which are common with the system 100 of FIG. 1, and like references are used for like elements.

An EIR proxy 204 is provided between the EIR 106 and the MSC 202 and the MSC 202 is appropriately configured to send messages to the EIR 106 via the EIR proxy 204. Additionally, the MSC 202 is adapted to send an extended MAP protocol 'CheckIMEI' message containing both the IMEI and the IMSI of the mobile telephone 102.

Figure 3:
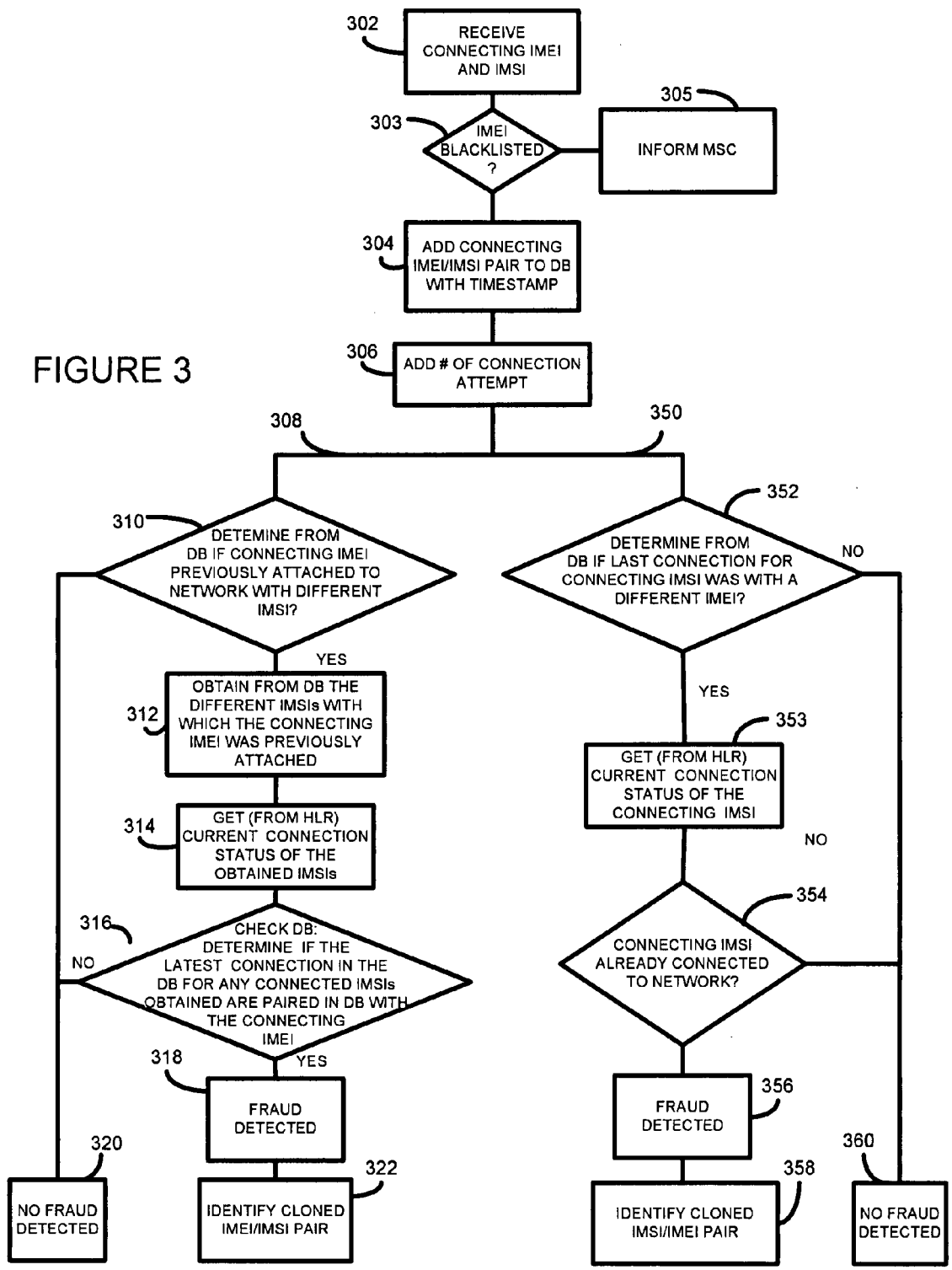
FIG. 3 is a flow diagram outlining example processing steps according to an embodiment of the present invention.

Operation of the EIR proxy 204 will now be described with additional reference to FIG. 3, which is a flow diagram outlining example processing steps in accordance with an embodiment of the present invention. The processing steps shown in FIG. 3 may, for example, be performed by an appropriate processor module of the EIR proxy 204.

The EIR proxy 204 is arranged in such a way so as to appear to the MSC 202 as the EIR 106. At step 302 the EIR proxy 204 receives, for example via an appropriate receiver module, the IMEI and IMSI identifier pair of the connecting mobile station 102 in a 'CheckIMEI' message from the MSC 202. Hereinafter, the IMEI and IMSI of the connecting mobile station 102 are referred to as the connecting IMEI and the connecting IMSI.

The EIR proxy 204 checks (step 303), for example through an appropriate interface, with the EIR 106 to determine whether the connecting IMEI is blacklisted. If the EIR 106 indicates that the connecting IMEI is blacklisted the MSC 206 is informed (step 305) and blocks access to the network.

In the present example the connecting IMEI is IMEI 1 and the connecting IMSI is IMSI 1, and the time is $T_6$.

The EIR proxy has access, for example through an appropriate interface, to a connection history database 206 which holds information used, as described later, in determining whether an IMEI or an IMSI has been cloned. At step 304 the connecting IMEI/IMSI pair, IMEI 1 and IMSI 1, along with the current timestamp, $T_6$, are stored in the connection history database 206 (see Table 1).

At step 306 the incremental number of the connection attempt of the connecting IMEI/IMSI pair is also stored in the connection history database 206. The number of the previous connection attempt, if any, may be found, for example, by searching the connection history database 206 in a suitable manner.

Table 1 below shows an example extract of the connection history database 206 in accordance with an embodiment of the present invention.

TABLE 1

| IMEI | IMSI | TIME | #CONNECTIONS |
|---|---|---|---|
| 1 | 1 | $T_0$ | 1 |
| 1 | 2 | $T_1$ | 1 |
| 1 | 1 | $T_2$ | 2 |
| 2 | 1 | $T_3$ | 2 |
| 3 | 3 | $T_4$ | 1 |
| 1 | 4 | $T_5$ | 1 |
| 1 | 1 | $T_6$ | 3 |

In other embodiments other suitable data may also be stored therein, and the data may also be stored in differing arrangements.

The EIR proxy 204 then either performs a check to determine whether the connecting IMEI has been cloned, by following processing path 308, or performs a check to determine whether the connecting IMSI has been cloned, by following processing path 350. Alternatively, both processing paths may be followed, either in series or in parallel.

To determine whether the connecting IMEI has been cloned the connection history database 206 is searched (step 310) to determine whether the connecting IMEI has previously attempted to connect to the network with an IMSI other than the connecting IMSI. If the connecting IMEI has only ever been connected to the network with the connecting IMSI this indicates that it is unlikely that the connecting IMEI has been cloned (step 320).

If the connection history indicates that the connecting IMEI has been previously attached to the network with an IMSI other than the connecting IMSI then further checking is required to determine whether cloning has taken place. At this stage it is not possible to determine whether the connecting IMEI has been cloned since, for example, in GSM systems the owner of SIM card including an IMSI may freely use that SIM card in any suitable mobile station.

At step 312 the connection history database 206 is searched again, this time to obtain the IMSIs with which the connecting IMEI has previously attempted to connect to the network. In the present example, and referring to Table 1, it can be seen that IMEI 1 previously attempted to connect to the network, at $T_1$, with IMSI 2, and also previous attempted to connect to the network with IMSI 4 at $T_5$.

The current connection statuses of any IMSIs identified in step 312 are then obtained, for example from the HLR 108 through an appropriate interface, (step 314). If an IMSI identified at step 314 is indicated as being currently connected to the network the connection history database 206 is searched again to determine whether the latest entry in the connection history database for that IMSI shows that it is currently paired with the connecting IMEI. If not, it is determined that no cloning of the IMEI has been detected (step 320). Otherwise it is determined that the connecting IMEI has been cloned (step 318). At this stage, however, it should be noted that all that has been detected is the presence of a cloned IMEI, without identifying which IMEI is the genuine IMEI and which IMEI is the cloned IMEI.

In the present example from the connection history database 206 it can be seen that the connecting IMEI, IMEI 1, previously attempted to connect to the network paired with IMSI 2, at $T_1$, and with IMSI 4 at $T_5$. The HLR 108 reports that IMSI 4 is currently connected to the network (step 314) and the connection history database 316 is checked (step 316) to see whether the latest entry in the connection history database for IMSI 4 shows that IMSI 4 is paired with IMEI 1. As this is the case, it is determined that IMEI 1 has been cloned (step 318).

At step 322 an attempt is made to distinguish the genuine IMEI from the cloned IMEI using the connection history stored in the database 206, as described in more detail below.

In order to determine whether an IMSI has been cloned the path 350 is followed as mentioned above.

At step 352 the connection history database 206 is searched to determine if the last time the connecting IMSI attempted to connect to the network was with an IMEI other than the connecting IMEI. If the last recorded connection attempt in the connection history database 206 of the connecting IMSI was with the connecting IMEI, it is deemed unlikely that the IMSI has been cloned (step 360).

If it is determined that the last time the connecting IMSI attempted to connect to the network it was with an IMEI other than the connecting IMEI (step 352) the HLR 108 is interrogated, for example through use of a suitable interface, such as by using a MAP_ANY_TIME_INTEROGATION message, (step 353) to obtain the current connection status of the connecting IMSI. If, at step 354, it is determined that the connecting IMSI is not currently connected to the network it is determined unlikely that the IMSI has been cloned (step 360). Otherwise, it is determined that the connecting IMSI is still connected to a different IMEI which implies that the connecting IMSI has been cloned (step 356).

In the present example it is determined (step 352) from the connection history database 206 that the last time connecting IMSI, IMSI 1, attempted to connect to the network was with an IMEI (IMEI 2) other than the connecting IMEI (IMEI 1). If at steps 353 and 354 it is determined that IMSI 1 is still connected to the network, it is assumed that IMSI 1 is connected to the network paired with IMEI 2, which indicates that the IMSI 1 has been cloned (step 356).

It should be noted, however, that the HLR alone is not able to detect whether an IMSI has been cloned, even where the same IMSI is concurrently connected twice to the HLR. This is because, according to 3GPP TS 29.002, it is possible for the same subscriber (same IMSI) to attach at the same time, with two different handsets (IMEI), to the HLR.

As described above with reference to the step 322, once it has been determined that an IMSI has been cloned step 358 aims at determining which of the currently connected IMSIs is the genuine IMSI, and which is the cloned IMSI.

The contents of the connection history database 206 are built up over time when a connection attempt is made by a communication device, and the IMEI and IMSI identifiers associated with that device at the time of the connection attempt are stored in the database.

In the present embodiment, the connection history database 206 is arranged to store details of the around the last 50 connection attempts made for each IMEI/IMSI pair. Those skilled in the art, however, will appreciate that more or less connection history entries for each IMEI/IMSI pair may also be stored depending on particular requirements. As described above, the connection history details may include a timestamp and the incremental number of connection attempts.

In a further embodiment the connection history database 206 may include additional details associated with each IMEI/IMSI pair. For example, the connection history database 206 may be arranged to permanently store the earliest recorded connection attempt for each IMEI/IMSI pair. This information could be obtained either from step 304 described above, or alternatively, or in addition thereto, could be supplied directly to the connection history database 206 by a third party such as a network operator. For example, many telephones are sold as package comprising a mobile station with an IMEI and a SIM card with an IMSI. Thus, the network operator can supply details of this first known pairing to the database 206 in any suitable manner.

In a still further embodiment, location information of the connecting IMEI/IMSI pair is further stored in the connection history database 206. This information may be obtained, for example, when the HLR 108 is interrogated at steps 314 and/or 353.

At steps 322 and 358 an attempt is made to distinguish the genuine IMEI/IMSI pair from the IMEI/IMSI pair in which one of the identifiers has been determined as being cloned.

Typically, it is assumed that the earliest recorded connection attempt for an IMEI/IMSI pair in the connection history database 206 is genuine. This is because the majority of criminal cloning occurs as a result of a theft of a genuine mobile station and this will typically occur after a mobile station has been used by the genuine owner. Cloning of an IMSI may occur, for example, through temporary interception of the SIM card from which the IMSI may be extracted.

For example, when in the above example it is determined that a cloned IMEI 1 is detected paired with IMSI 4 using the connection history database 206 it can be determined that the first entry for the IMEI 1 was with IMSI 1 at $T_0$. Thus, it can be reasonable assumed that the pairing IMEI 1 with IMSI 4 is fraudulent and that it is this pairing that uses the cloned IMEI 1.

By way of further example, when, as described above, it is determined that a cloned IMSI 1 is detected paired with IMEI 2, it can be fairly assumed that the pairing IMSI 1 with IMEI 2 is fraudulent, since the earliest recorded connection attempt stored in the connection history database shows that IMSI 1 was first paired with IMEI 1.

However, since subscribers are generally free to use a SIM card connecting their IMSI in any mobile station, it may be preferable, to avoid inaccurate determinations by performing additional determination steps. For example, a determination of a genuine IMEI or IMSI from a cloned IMEI or IMSI may achieved, either alternatively or in addition to the above described techniques, by looking at the number of connection attempts that have been made in the connection history database 206. Again, it can be fairly assumed that the IMEI/IMSI pairing with the greatest number of recorded connections is genuine (step 322).

In a yet further embodiment, the steps 322 and 358 may determine a genuine IMEI/IMSI pair from an IMEI/IMSI pair of which one of the identifiers has been cloned identifier by taking into account location information stored in the connection history database 206.

For example, if it is determined that a connecting IMSI/IMEI pair is connecting from Paris, but that the previous connection attempt was from New York, it can be assumed that one of the IMSI/IMEI pairs includes a cloned identifier if the time difference between the two connection attempts is less than that required to travel from Paris to New York.

Once a cloned IMEI or IMSI has been identified, and the genuine IMEI/IMSI pair distinguished from the IMEI/IMSI pair containing a cloned identifier, a suitable message or signal may be sent to a fraud management system (not shown). The fraud management system may take any appropriate action such as signalling an alarm, disconnecting or causing the cloned IMEI or cloned IMSI to be refused connection to the network or disconnected from the network as appropriate, and the like.

Figure 4:
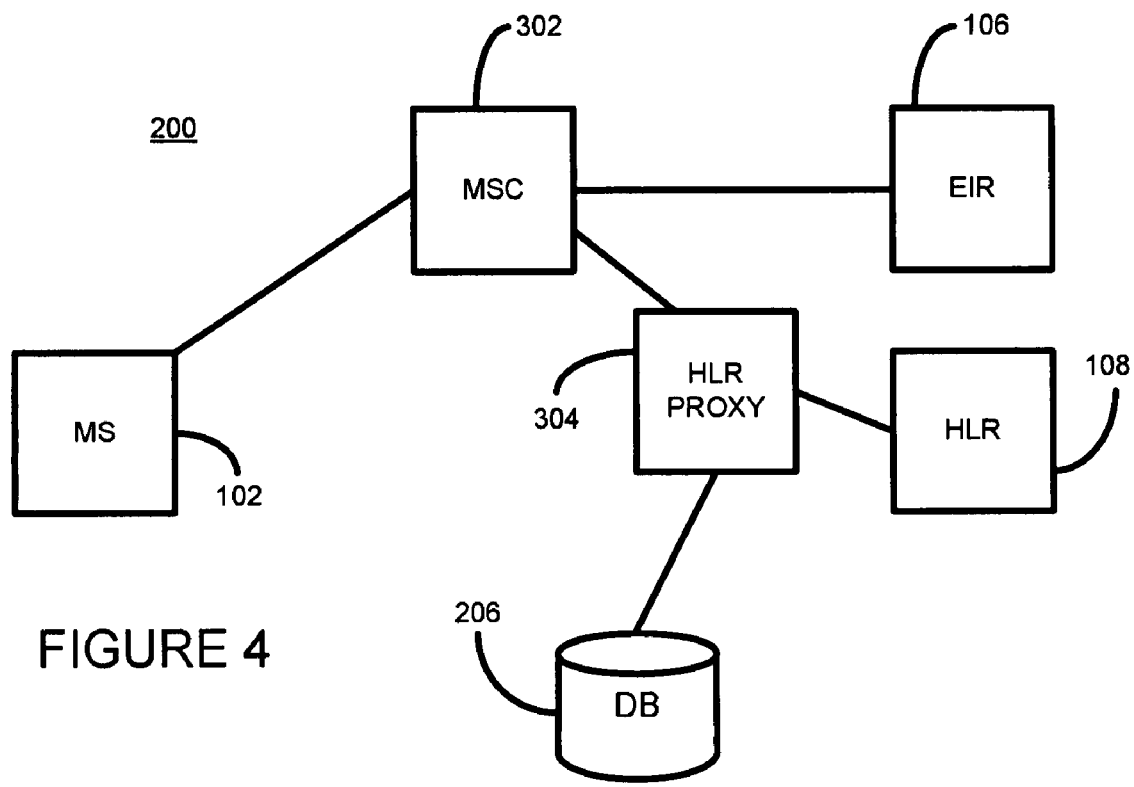
FIG. 4 is a block diagram showing a simplified view of a mobile telephony system according to a further embodiment of the present invention.

In a yet further embodiment, shown in FIG. 4, the above described system and method can be arranged as a HLR proxy 304 such that all messages sent from the MSC 302 to the HLR 108 are sent through the HLR proxy 304. In this embodiment, the processing steps 304 to 360 described above and with reference to FIG. 3 are performed. The HLR proxy 304 may be suitably arranged to perform the processing steps 304 to 360 in response to one or more predetermined events. Such events may include, for example, the connection attempt of a communication device having a given IMEI/IMSI pair.

Although the embodiments are described above with reference to IMEI and IMSI identifiers, those skilled in the art will appreciate that other suitable identifiers may also be used, either in addition to or in place thereof. Examples of other identifiers include, International Mobile Equipment Identity and Software Version (IMEISV), mobile identification number (MIN), electronic serial number (ESN), and the like. Reference herein to mobile telephones will be understood not to be limited thereto, and will be understood to encompass all forms of mobile stations and communication devices both mobile and fixed in nature.

The invention claimed is:

1. A method of identifying cloned identifiers comprising:
receiving a first identifier relating to the identity of a communication device and a second identifier relating to the identity of a subscriber at the time of a connection attempt to a network; and
determining whether one of the identifiers has been cloned, the determination being made in part through information obtained from a connection history database, and in part through information obtained from a network element,
in which the connection history database stores previously received first and second identifiers, and
in which determining whether one of the identifiers has been cloned comprises determining whether the first identifier has been cloned, the method further comprising:
determining from the connection history database whether the received first identifier has previously attempted to connect to the network with a number of second identifiers other than the received second identifier, and where it is so determined, obtaining those other second identifiers, and
determining from the network element whether any of the other second identifiers are currently connected to the network.

2. The method of claim 1, further comprising
determining from the connection history database, for each of the other second identifiers, whether the latest entry in connection history database is paired with the received first identifier, and if it so determined, signaling that the first identifier has been cloned.

3. The method of claim 1 in which determining whether one of the identifiers has been cloned further comprises determining whether the second identifier has been cloned, the method further comprising:
determining from the connection history database whether the last connection attempt for the received second identifier was with a first identifier other than the received first identifier;
determining from the network element whether the received second identifier is currently connected to the network; and where it is so determined, signaling that the received second identifier has been cloned.

4. The method of claim 1, further comprising storing a timestamp correlating to previously received first and second identifiers in the connection history database.

5. The method of claim 1, further comprising, determining whether the received first and second identifiers are the genuine first and second identifiers, the determination being based on information stored in the connection history database,
in which the earliest recorded first and second identifiers entered in the connection history database are the genuine first and second identifiers.

6. The method of claim 5, wherein the step of storing the received identifiers further includes storing an incremental connection attempt number for the received first and second identifiers, and wherein the step of determining the genuine identifiers comprises using the stored incremental connection attempt number.

7. The method of claim 6, further comprising causing the disconnection of a mobile communication device having an identifier determined as having been cloned.

8. The method of claim 1, wherein the network is a mobile telephony network, wherein the communication devices are mobile stations, wherein the network element is a home location register, wherein the first identifier is an international mobile equipment identifier, IMEI, and wherein the second identifier is an international mobile subscriber identity, IMSI.

9. An apparatus for determining if an identifier has been cloned, comprising:
a receiver for receiving via a network a first identifier relating to the identity of a communication device and a second identifier relating to the identity of a subscriber associated with a communication device;
a first interface for accessing a network element for providing the connection status of the first identifier;
a second interface for accessing a connection history database, the connection history database being configured to store, in response to a connection attempt by a communication device, connection data related to the first and second identifiers associated with that communication device; and
a processor for determining whether one of the received identifiers has been cloned, the determination being made in part through data obtained from the connection history database, and in part through data obtained from the network element,
in which the processor further determines whether the second identifier has been cloned by determining from the connection history database whether the last connection attempt for the received second identifier was with a first identifier other than the received first identifier; and determining from the network element whether the received second identifier is currently connected to the network.

10. A system for identifying cloned identifiers comprising:
mobile switching center (MSC) configured to determine an international mobile equipment identity (IMEI) and an international mobile subscriber identity (IMSI) associated with a mobile station;
an equipment identity register (EIR) configured to classify IMEI numbers;
an equipment identity register proxy (EIR proxy) electronically coupled between the MSC and the EIR; and
a connection history database configured to store a number of IMEI and IMSI pairs, in which the EIR proxy is configured to receive the IMEI and the IMSI from the MSC, and access the connection history database to determine whether the IMEI or the IMSI have been cloned.

11. The system of claim 10, in which the EIR proxy is further configured to determine, via the EIR, whether the IMEI is blacklisted, graylisted, or whitelisted.

12. The method of claim 1, further comprising, determining whether the received first and second identifiers are the genuine first and second identifiers, in which the first and second identifier pairing with the greatest number of recorded connections are the genuine first and second identifiers.

13. The method of claim 1, further comprising, determining whether the received first and second identifiers are the genuine first and second identifiers, in which the determination is based on location information stored in the connection history database.

14. The method of claim 13, in which determining whether the received first and second identifiers are the genuine first and second identifiers comprises:

determining whether a connection of the first and second identifiers occurred at a different location than the location of a different connection of the first or second identifiers;

determining that the first or second identifiers are not genuine if the locations are different and the time difference between the two connections of the first and second identifiers is less than that required to travel from the different locations.

* * * * *